(12) United States Patent
Flaum et al.

(10) Patent No.: US 11,904,702 B2
(45) Date of Patent: Feb. 20, 2024

(54) METHOD AND DEVICE FOR ACTUATING AN ELECTRICAL DRIVE OF A TRAILER VEHICLE

(71) Applicant: ZF CV Systems Global GmbH, Bern (CH)

(72) Inventors: Nikolai Flaum, Hannover (DE); Johannes Heseding, Hannover (DE); Janik Ricke, Uetze (DE); Torsten Wallbaum, Duingen (DE)

(73) Assignee: ZF CV Systems Global GmbH, Bern (CH)

( * ) Notice: Subject to any disclaimer, the term of this patent is extended or adjusted under 35 U.S.C. 154(b) by 28 days.

(21) Appl. No.: 17/573,397

(22) Filed: Jan. 11, 2022

(65) Prior Publication Data

US 2022/0126704 A1 Apr. 28, 2022

Related U.S. Application Data

(63) Continuation of application No. PCT/EP2020/069206, filed on Jul. 8, 2020.

(30) Foreign Application Priority Data

Jul. 22, 2019 (DE) .................... 10 2019 119 787.2

(51) Int. Cl.
*B60L 15/38* (2006.01)
*B60L 15/20* (2006.01)
*B62D 59/04* (2006.01)

(52) U.S. Cl.
CPC ........... *B60L 15/38* (2013.01); *B60L 15/2009* (2013.01); *B62D 59/04* (2013.01); *B60L 2200/28* (2013.01);
(Continued)

(58) Field of Classification Search
CPC .. B60L 15/38; B60L 15/2009; B60L 2200/28; B60L 2240/12; B60L 2240/14;
(Continued)

(56) References Cited

U.S. PATENT DOCUMENTS 10,906,406 B1 * 2/2021 Healy ...................... B60K 6/48
2008/0169144 A1 * 7/2008 DeGrave ................. B60L 50/40
180/165

(Continued)

FOREIGN PATENT DOCUMENTS

CA 2 836 450 A1 6/2015
CN 102015390 A 4/2011
(Continued)

OTHER PUBLICATIONS

International Search Report of the European Patent Office dated Nov. 11, 2020 for international application PCT/EP2020/069206 on which this application is based.

(Continued)

*Primary Examiner* — Mahmoud S Ismail
(74) *Attorney, Agent, or Firm* — Walter Ottesen, P.A.

(57) ABSTRACT

The disclosure relates to a method for actuating an electrical drive of a trailer vehicle with a towing vehicle. According to an embodiment, the method include the steps of: determining a current mass of the towing vehicle; determining a current drive force of the towing vehicle; determining an acceleration demand in dependence upon the current mass and the current drive force; and, actuating the electric drive via an actuating signal in dependence upon the acceleration demand. The disclosure also relates to a control device for executing the method, a towing vehicle, a trailer vehicle and a semi-trailer truck.

21 Claims, 4 Drawing Sheets

(52) U.S. Cl.
CPC ....... *B60L 2240/12* (2013.01); *B60L 2240/14* (2013.01); *B60L 2240/26* (2013.01); *B60L 2240/421* (2013.01); *B60L 2240/423* (2013.01); *B60L 2240/465* (2013.01); *B60L 2240/54* (2013.01)

(58) Field of Classification Search
CPC ........... B60L 2240/26; B60L 2240/421; B60L 2240/423; B60L 2240/465; B60L 2240/54; B62D 59/04
USPC .......................................................... 701/477
See application file for complete search history.

(56) References Cited

U.S. PATENT DOCUMENTS

| | | | |
|---|---|---|---|
| 2009/0276109 A1 | 11/2009 | Jensen et al. | |
| 2009/0276134 A1 | 11/2009 | Sherman | |
| 2015/0060160 A1 | 3/2015 | Kerschl et al. | |
| 2015/0148993 A1* | 5/2015 | Anton | G09B 9/10 903/930 |
| 2016/0318406 A1 | 11/2016 | Healy | |
| 2018/0201157 A1* | 7/2018 | Chen | B60L 15/2036 |
| 2019/0009760 A1 | 1/2019 | Zenner et al. | |
| 2019/0359125 A1* | 11/2019 | Nagata | B60W 40/13 |
| 2020/0238990 A1* | 7/2020 | Ma | B60W 30/18 |
| 2021/0046845 A1* | 2/2021 | Healy | B60L 7/18 |
| 2021/0245579 A1* | 8/2021 | Van Wijk | H02J 7/1415 |
| 2022/0229446 A1* | 7/2022 | Switkes | B60W 30/18 |
| 2023/0059385 A1* | 2/2023 | Healy | B62D 59/04 |

FOREIGN PATENT DOCUMENTS

| | | |
|---|---|---|
| CN | 109229100 A | 1/2019 |
| DE | 10 2008 049 225 A1 | 4/2010 |
| DE | 10 2010 042 907 A1 | 4/2012 |
| DE | 10 2016 222 024 A1 | 5/2018 |
| EP | 2 842 814 A1 | 3/2015 |

OTHER PUBLICATIONS

WABCO Vehicle Control Systems, "Das Anti-Blockier-System (ABS) und die Antriebs-Schlupf-Regelung (ASR)", Version 002/02.11, 815 020 194 3, copyright WABCO 2011, www.wabco-auto.com, pp. 1 to 36.

Written Opinion of the International Searching Authority dated Nov. 11, 2020 for international application PCT/ EP2020/069206 on which this application is based.

* cited by examiner

METHOD AND DEVICE FOR ACTUATING AN ELECTRICAL DRIVE OF A TRAILER VEHICLE

CROSS REFERENCE TO RELATED APPLICATIONS

This application is a continuation application of international patent application PCT/EP2020/069206, filed Jul. 8, 2020 designating the United States and claiming priority from German application 10 2019 119 787.2, filed Jul. 22, 2019, and the entire content of both applications is incorporated herein by reference.

TECHNICAL FIELD

The disclosure relates to the actuation of electric drives in trailer vehicles. For this purpose, the disclosure relates in particular to a method for actuating an electric drive of a trailer vehicle and to devices and vehicles for executing the method. A trailer vehicle is pulled by a towing vehicle, which is, for example, a utility vehicle. Such trailer vehicles (hereinafter also referred to as trailers for short) which are pulled by utility vehicles are, in particular, semitrailers and drawbar trailers.

BACKGROUND

Utility vehicles are known, which, in addition to an internal combustion engine as the primary drive source, additionally have an electric drive for supporting an internal combustion engine. The electric drives in the utility vehicles serve, for example, to enable the internal combustion engine to be operated within an energy efficient speed range or to provide additional thrust, for example when starting or going uphill. Moreover, with electric drives, kinetic and potential energy of the vehicle can be recovered and stored as electric energy in an energy store of the electric drive.

It is moreover known that trailers for utility vehicles can also be equipped with an electric drive in order for the trailer to provide an additional drive force for the towing vehicle, for example when going uphill. In EP 2 842 814 B1, a control unit of the towing vehicle is connected to a further control unit in the trailer so that they communicate. The further control unit, which receives control commands from the control unit, then controls an electric drive in the trailer vehicle.

According to the prior art, it is therefore known that a towing vehicle communicates with a trailer vehicle in order to transmit a drive request from the towing vehicle to the trailer vehicle, for example depending on a gas pedal or brake pedal position. However, the actual behavior of the trailer vehicle and the extent to which the drive of the trailer vehicle is involved in driving a towing vehicle and trailer vehicle combination as a whole could hitherto only be measured using complex sensor equipment. However, this essentially needs to be known, in particular to prevent pushing on the part of the trailer vehicle which can lead to an unstable driving behavior. It is therefore known from the prior art to provide additional sensors on the towing vehicle in order to monitor the actual reaction of a drive of the trailer vehicle and to then regulate the drive, for example, via a control command of the towing vehicle.

Consequently, deceleration or acceleration of the vehicle trailer via its electric drive can only take place iteratively until a correct measured value has been established at the sensor equipment additionally mounted on the towing vehicle in order to prevent unstable driving states. This results in a delayed regulating train for the drive support and also for deceleration, which can be used as recuperation for an electric drive. The consequence is lower efficiency on the one hand, whereas, on the other, the electric drive can provide only limited support, or even no support, in stability-critical situations which are not caused by the electric drive and in which driver assistance systems intervene, for example. In particular, additional components are consequently necessary as a result of the known systems, whereby additional costs are involved and efficient use of the electric drive is not ensured.

SUMMARY

It is therefore an object of the present disclosure to actuate an electric drive of a trailer vehicle in an improved manner compared to the prior art, wherein the actuation should preferably be possible with little or no additional component expenditure and should at the same time enable more efficient targeted use of the drive.

In particular, it is an object of the present disclosure to address at least one of the problems previously mentioned in the prior art.

For this purpose, the disclosure relates to a method for actuating an electric drive of a trailer vehicle with a towing vehicle. The method includes: determining a current mass of the towing vehicle; determining a current drive force of the towing vehicle; determining an acceleration demand in dependence upon the current mass and the current drive force; and, actuating the electric drive via an actuating signal in dependence upon the acceleration demand.

The disclosure accordingly discloses a method for actuating an electric drive of a trailer vehicle with a towing vehicle. The method therefore serves to actuate an electric drive.

An electric drive preferably includes at least one electric motor, which can be operated in motor mode or in generator mode. For this purpose, the motor is preferably connected to an energy store, namely a battery or an accumulator, via a controllable converter. In motor mode, the converter supplies the electric drive with energy from the energy store in order to generate a positive torque. In generator mode, a kinetic energy of a wheel connected to the electric motor is converted into electric energy and this is fed into the energy store via the converter and stored therein. This generator mode is also referred to as recuperation and, at the same time, serves for braking the vehicle with the electric drive.

A towing vehicle in particular includes a utility vehicle here, in particular such as a truck or a tractor. A trailer vehicle, which is also referred to as a trailer for short, includes, for example, a semitrailer and a drawbar trailer, such as a center axle trailer or a pony trailer, for example.

According to the method, a current mass of the towing vehicle pulling the trailer vehicle is determined. A current mass of the towing vehicle is preferably determined by a control unit, preferably a brake control unit. For this purpose, the brake control unit receives the current mass from a further control unit, for example, which determines the mass depending on the air pressures of air springs arranged at the axles of the towing vehicle. The mass is, for example, preferably already known in the brake control unit for applications such as traction control, for example, or other safety-relevant systems, or it can be read out from a control unit of an air spring system which controls the air springs.

A current drive force of the towing vehicle is furthermore determined according to the method. A current drive force here preferably corresponds to a force which at least one drive of the towing vehicle, namely an internal combustion engine and/or an electric drive of the towing vehicle, for example, exerts on at least one drive wheel of the towing vehicle. The drive force particularly preferably includes the total force of the drive, or—in the case of a plurality of drives—all drives, which is exerted on all drive axles and/or all drive wheels of the towing vehicle. This drive force is preferably provided on a CAN bus in the towing vehicle as a value or at least as a value from which the drive force can be derived. The value is preferably provided by a motor control unit or a vehicle control unit, for example, and can be particularly preferably read out from a bus, preferably via a brake control unit of the towing vehicle, which executes the method.

An acceleration demand is furthermore determined depending on the current drive force of the towing vehicle and the current mass of the towing vehicle and the electric drive of the trailer vehicle is then actuated depending on the acceleration demand, in particular in order to generate a desired drive force via a torque via the electric drive, namely in particular the electric motor or the electric motors.

Determining the current drive force of the towing vehicle and the current mass of the towing vehicle enables the acceleration demand to be determined depending on an acceleration of the towing vehicle which results from the current drive force and the current mass of the towing vehicle. Knowing the acceleration of the towing vehicle then enables an acceleration demand for the electric drive to be determined in a supplementary manner, without additional sensor equipment, in order to also achieve suitable acceleration of the trailer vehicle via a corresponding actuation of the electric drive. Since a desired acceleration of the trailer vehicle via the acceleration demand is adapted to match an acceleration of the towing vehicle, the risk of a pulling or pushing action on the part of the trailer vehicle can be diminished or reduced without additional sensors needing to be arranged in the region of the drawbar or coupling between the towing vehicle and trailer vehicle, for example, in order to monitor the behavior of the trailer vehicle.

In contrast, sensor equipment for determining the current mass and the current drive force is present in any case in current vehicles, in particular utility vehicles, which means that it is possible to use the existing sensor equipment and dispense with additional sensor equipment and therefore additional components. In this case, the method can preferably be executed in a control of the towing vehicle, in particular a brake control unit, in that at least the current mass of the towing vehicle, but also a current drive force of the towing vehicle, is generally already available. According to a first embodiment, the acceleration demand is determined depending on the current mass of the towing vehicle and additionally depending on the current mass of the trailer vehicle. The mass of the trailer vehicle is preferably determined for this purpose. Analogously to the determination process for the towing vehicle, the mass of the trailer vehicle can be derived, that is, determined or measured, from a pressure of air springs present in the trailer vehicle, for example. The mass of the trailer vehicle is, for example, preferably provided in the trailer vehicle for a control unit, in particular a trailer brake control unit, of the trailer vehicle or is known to this control unit and can therefore be conveyed in the form of a signal or data signal to a control unit, in particular the control unit of the towing vehicle, which executes the inventive method.

Alternatively, it is also possible that a current acceleration of the towing vehicle, which is determined from the current drive force and the current mass of the towing vehicle, is firstly conveyed in the form of a signal or data signal to the control unit, in particular the brake control unit, of the trailer vehicle by the control unit, in particular the brake control unit, of the towing vehicle, and the acceleration demand is then determined in the brake control unit, preferably the brake control unit, of the trailer vehicle, depending on the mass of the trailer vehicle and the current drive force of the towing vehicle and the current mass of the towing vehicle.

Taking the mass of the trailer vehicle into account when determining the acceleration demand therefore enables a desired drive force for the electric drive of the trailer vehicle to be determined in a simple manner. The current acceleration of the towing vehicle is preferably already known owing to the current determined drive force and the current determined mass of the towing vehicle or it can be derived therefrom so that a desired acceleration of the trailer vehicle can be derived from this current acceleration of the towing vehicle. A desired drive force of the electric drive can in turn be determined in a simple manner from the desired acceleration of the trailer vehicle, taking into account the now additionally determined mass of the trailer vehicle. A desired drive force of the electric drive in the form of the acceleration demand can consequently be determined more precisely in a simple manner.

According to a further embodiment, the acceleration demand includes a value for a desired drive force of the electric drive. The value for a desired drive force, which corresponds to the acceleration demand, is determined for example in the brake control unit in that the acceleration of the towing vehicle is firstly determined depending on the current drive force of the towing vehicle and the current mass of the towing vehicle is determined. A requested or desired acceleration of the trailer vehicle is then determined depending on the acceleration of the towing vehicle and the desired drive force of the electric drive is in turn determined depending on the requested or desired acceleration of the trailer vehicle and the current mass of the trailer vehicle.

If, on the other hand, according to a further embodiment, a value of a desired acceleration is conveyed in the form of the acceleration demand by the towing vehicle to the trailer vehicle, the value of the current drive force of the towing vehicle and the current mass of the towing vehicle is determined. The desired drive force for the electric drive is then first determined in the trailer vehicle, in particular via the trailer brake control unit, depending on the desired acceleration and the current mass of the trailer vehicle.

The actuation of the drive can consequently be executed in a simple manner by a trailer brake control unit and a brake control unit of the towing vehicle.

According to a further embodiment, the desired acceleration of the trailer vehicle is less than or equal to the current acceleration of the towing vehicle or is selected as such.

A pushing of the towing vehicle is therefore prevented since the towing vehicle always executes a comparatively equal or greater acceleration compared to the trailer vehicle in a driving or braking situation. Uncontrollable driving states of the vehicle combination having a towing vehicle and a trailer vehicle are thus prevented.

According to a further embodiment, the current acceleration of the towing vehicle is determined depending on the result of a division of the current drive force by the current mass of the towing vehicle or corresponds to this result. Additionally or alternatively, the desired drive force of the trailer vehicle is determined depending on the result of a product of the current mass of the trailer vehicle and the desired acceleration of the trailer vehicle. Mathematical values for the desired drive force can therefore be determined in a simple manner via the known relationship F=m*a.

According to a further embodiment, the current acceleration of the towing vehicle is additionally determined depending on a current slip of at least one driven wheel of the towing vehicle.

A current slip of the towing vehicle here includes a drive slip and a brake slip, which describe the ratio of the speed of a driven wheel of the towing vehicle to a non-driven and therefore positively rotating wheel of the towing vehicle or to a reference speed of the vehicle. A slip value, that is, a value of the slip, is therefore greater than zero in the case of a drive slip and less than zero in the case of a brake slip.

The method can preferably include determining the current slip, wherein the determination of the slip can be achieved, for example, by determining existing status values of the towing vehicle and by deriving the slip from these status values or via indirect or direct measurement of the slip.

An advantageous embodiment includes determining the slip in that signals of wheel speed sensors of at least one driven and one non-driven wheel are recorded in order to thereby determine a slip by comparing the wheel speeds. According to a further embodiment, the wheel speed of only the driven wheel is compared to a current speed of the vehicle, which can also be referred to as the reference speed.

It can be advantageous to take into account the current slip of at least one wheel of the towing vehicle when determining the acceleration demand, in particular for determining the current acceleration of the towing vehicle, since an actual real acceleration of the towing vehicle is dependent, for example, on how friction values of the surface on which the movement of the towing vehicle is conveyed through the wheels are generated. For example, if the roadway is comparatively flat, the actual acceleration of the towing vehicle is less than an acceleration determined solely from the current drive force and the mass of the towing vehicle. This can be corrected by taking the slip into account and the determination of the current acceleration can therefore be improved.

According to a further embodiment, the acceleration demand includes a maximum value, in particular of a desired drive force, for a torque or a drive force to be generated by the electric drive. Accordingly, in the case of an acceleration demand with a positive value, a maximum value for a desired drive force or a drive force which is to be generated by the electric drive is taken as a starting point. This means that, when increasing the speed or when starting the towing vehicle, for example, an acceleration demand with a maximum value, that is, a positive value, is conveyed to the electric drive. This maximum value is defined as a result of determining the acceleration demand, such that, when a drive force (that is, a drive torque derived therefrom or corresponding thereto) which corresponds to this maximum value is generated by the electric drive, the trailer vehicle does not, or does not yet, push the towing vehicle. The driving stability of the towing vehicle, in particular when cornering, can therefore be further ensured. The acceleration demand is preferably conveyed by a brake control unit of the towing vehicle to a brake control unit of the trailer vehicle via a CAN-ISO 11992-2.

According to a further embodiment, the electric drive of the trailer vehicle generates a drive force depending on an actuating signal. The actuating signal is furthermore generated depending on the acceleration demand and a charge status of at least one energy store of the electric drive. The actuating signal is generated from the acceleration demand, preferably by a brake control unit of the trailer vehicle.

According to the embodiment, it is taken in to account that, in the case of an energy store which still has a low charge and an acceleration demand with a positive value, for example, a comparatively low drive torque or drive force is generated by the actuating signal compared to when the energy store has a comparatively high or full charge. A certain residual energy in the energy store can therefore be reserved for emergency situations in which the electric drive is needed. Equally, in a case in which the acceleration demand includes a negative value, for example when the charge status of the energy store is comparatively low, a high negative drive torque or drive force, that is, a brake torque, is triggered or set by the electric drive as a result of the actuating signal, which contributes to the energy store being charged as quickly or to as great an extent as possible.

According to a further embodiment, the actuating signal is generated depending on at least a current speed of at least one electric motor of the electric drive. In this case, the efficiency of the motor, which depends on the current speed, is taken into account and only when the efficiency is acceptable is the electric drive also used as drive support for the towing vehicle.

According to a further embodiment, a motor speed-torque map is defined in the electric drive, which is preferably adjustable depending on a charge of an energy store of the electric drive. The actuating signal is furthermore generated such that the electric drive generates a drive torque or a drive force with a value which lies within the map at a given speed. A speed is measured accordingly or determined with the aid of the current operating parameters and, with the aid of the map, a torque or a force is determined which lies within the map and, at the same time, preferably does not exceed a maximum value specified by the acceleration demand.

It can therefore be ensured that, via the electric drive, the generated drive torque or drive force is always generated with regard to an acceptable efficiency of the electric drive. Accordingly, the motor speed-torque map is preferably defined or predetermined such that it includes drive torques at motor speeds which lie above a predefined efficiency.

According to a further embodiment, the electric drive sends a status signal to the towing vehicle, which signal at least includes the currently generated drive torque or drive force of the electric drive. The status signal accordingly includes the actuating signal or a signal derived from the actuating signal, for example.

Upon an acceleration demand or brake request on the part of the driver, depending on the component of the drive torque which is currently generated by the electric drive, the drive of the towing vehicle can generate a drive torque with the towing vehicle which is dependent thereon.

Alternatively or additionally, the status signal includes the current mass of the trailer vehicle. The status signal is preferably conveyed by the trailer brake control unit to the brake control unit of the towing vehicle via a CAN-ISO 11992-2 bus.

According to a further embodiment, the status signal includes a slip of the vehicle trailer, namely in particular a driven wheel of the vehicle trailer. This information relating to the slip of the vehicle trailer serves for determining the acceleration demand which is additionally determined depending on the current slip of the trailer vehicle. This information preferably also serves to enable the detection of, and a response to, unstable vehicle states of the vehicle trailer.

According to a further embodiment, the method is executed by a brake control unit of the towing vehicle and additionally or alternatively by a brake control unit of the trailer vehicle, namely a trailer brake control unit. The brake control units of the towing vehicle and the trailer vehicle are, in particular, already configured according to the prior art to detect the current slip of individual wheels, the masses of the respective vehicles and current drive forces and therefore serve for particularly easy implementation of the method. The brake control units of the towing vehicle and of the trailer vehicle are preferably connected to one another via a CAN bus 11992-2, which is realized via an electrical line. In this case, since it has hitherto not been used as standard, the message EBS 11 can be used for communication, in particular for conveying the acceleration demand.

The disclosure furthermore discloses a control unit, in particular of a towing vehicle or a trailer vehicle, for executing the method according to one of the above-mentioned embodiments. The control unit is preferably a brake control unit of the towing vehicle or a brake control unit of the trailer vehicle, which is also referred to as a trailer brake control unit. In the case of a control unit of the towing vehicle, the control unit here is configured to determine the current mass of a towing vehicle pulling the trailer vehicle and a current drive force of the towing vehicle. Furthermore, via the brake control unit of the towing vehicle, an acceleration demand is generated depending on the current mass and the current drive force and the acceleration demand is transmitted to a trailer brake control unit to actuate the electric drive. The brake control unit of the towing vehicle is preferably also configured to determine a mass of the trailer vehicle, which is determined by the trailer brake control unit, in order to take this into account when determining the acceleration demand. The brake control unit of the towing vehicle is furthermore configured to receive the current slip of at least one driven wheel of the trailer vehicle after this has been determined by the trailer brake control unit and to likewise take this slip into account to determine the acceleration demand.

In the case of a control unit provided as a trailer brake control unit, the control unit is accordingly configured to receive an acceleration demand from the towing vehicle and to thus actuate an electric drive of the trailer vehicle. In particular, such a trailer brake control unit has a memory for a motor speed-torque map in order to generate an actuating signal for the electric drive which is dependent on the acceleration demand and the motor speed-torque map. The trailer brake control unit is moreover preferably configured to send a status signal to a brake control unit of the towing vehicle. The status signal includes a current torque of the electric drive, at least a slip of at least one wheel of the trailer vehicle and/or the mass of the trailer vehicle.

The disclosure moreover relates to a towing vehicle with a brake control unit, in particular the above-mentioned control unit, for executing the method according to one of the aforementioned embodiments. The disclosure furthermore relates to a trailer vehicle with a trailer brake control unit, in particular with the above-mentioned trailer brake control unit, for executing the method according to one of the aforementioned embodiments. Finally, the disclosure discloses a combination including the towing vehicle and the trailer vehicle.

BRIEF DESCRIPTION OF THE DRAWINGS

The invention will now be described with reference to the drawings wherein.

DESCRIPTION OF THE PREFERRED EMBODIMENTS

Figure 1:
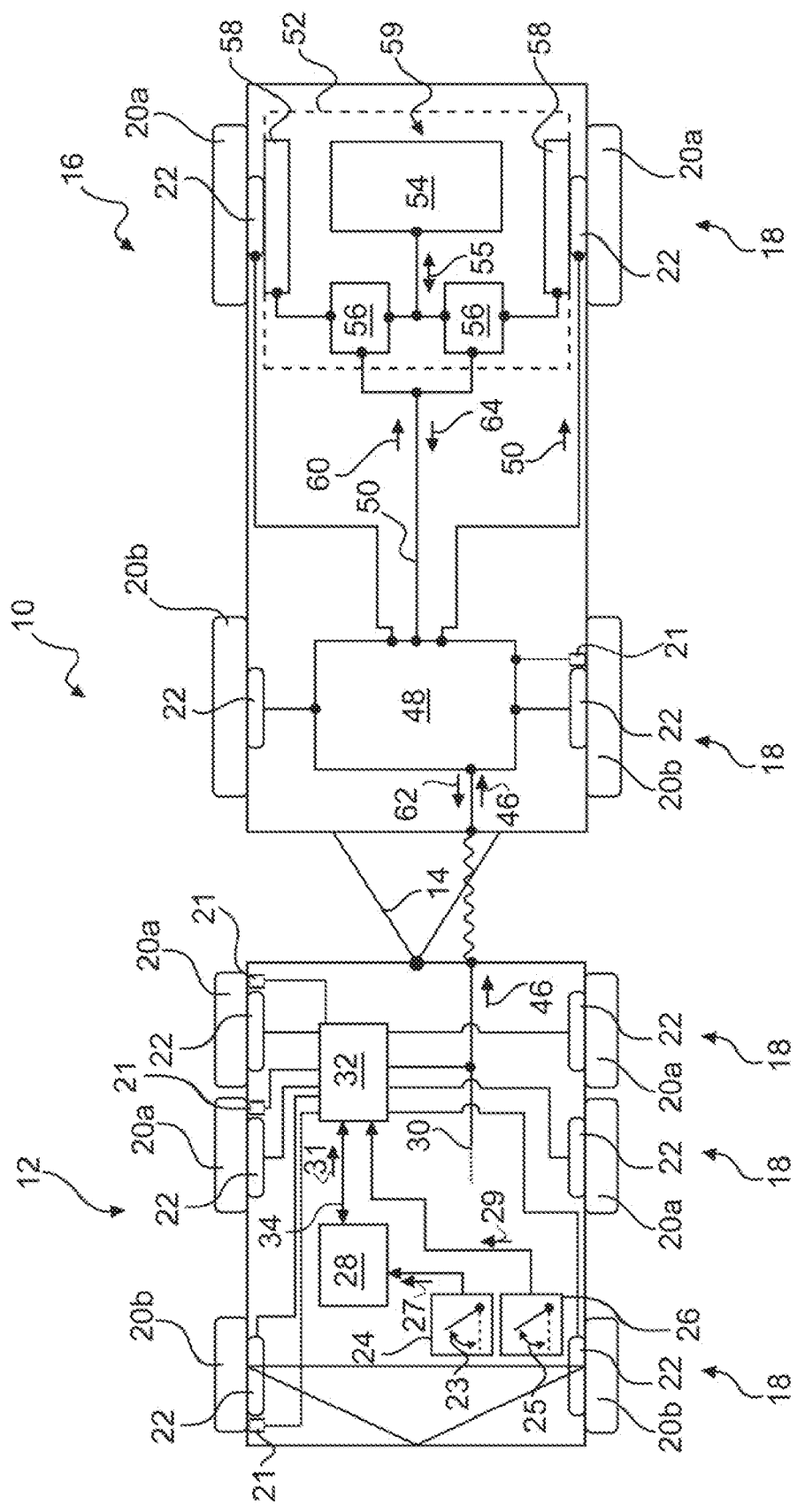
FIG. 1 shows a towing vehicle and trailer vehicle combination.

FIG. 1 shows a vehicle combination 10. The vehicle combination 10 includes a towing vehicle 12, which is, for example, a utility vehicle. The towing vehicle 12 is connected to a trailer vehicle 16 of the vehicle combination 10 via a drawbar 14. The trailer vehicle 16 can therefore be pulled by the towing vehicle 12. The towing vehicle 12 and the trailer vehicle 16 each include a plurality of axles 18, which each have two wheels 20a, 20b. The wheels 20a are driven wheels and therefore belong to a drive axle 18 and the wheels 20b are wheels without a drive and therefore belong to a non-driven axle 18. In this case, wheels 20b without a drive refer to non-driven wheels. Each of the wheels 20a, 20b is equipped with a friction brake 22 in order to brake the wheels 20a, 20b in the event of a brake request. At least one of the axles 18 of the towing vehicle 12 is driven by an internal combustion engine or an electric drive, wherein an internal combustion engine or an electric drive of the towing vehicle 12 is not illustrated in FIG. 1 for better clarity.

To drive the towing vehicle 12, a request for an increase in speed 27 or a brake request 29 is signaled by an operator of the towing vehicle 12 by varying a gas pedal position 23 of a gas pedal 24 and by varying a brake pedal position 25 of a brake pedal 26. According to an alternative embodiment not illustrated here, the request for an increase in speed 27 or a brake request 29 is generated by a control which controls an autonomous mode or a driver assistance mode.

In the embodiment illustrated here, for signaling purposes, the gas pedal 24 is connected to a vehicle control unit 28 and the brake pedal 26 is connected to a brake control unit 32. The vehicle control unit 28 relays control signals for actuating the drive (not illustrated) to a bus (not illustrated) connected to the vehicle control unit 28. From the request for an increase in speed 27, the vehicle control unit 28 relays a requested positive acceleration 31 and also conveys this to the brake control unit 32 via a connection 34. From the requested positive acceleration 31, the current drive force of the towing vehicle 12 can be determined in the brake control unit 32. The brake control unit 32 also monitors a current slip of at least one driven wheel 20a. For this purpose, wheel speed sensors 21 are provided on the wheels 20a, 20b. If a differential speed between a driven wheel 20a and a non-driven wheel 20b is detected, the slip is detected in the brake control unit 32.

To determine the mass of a support provided by an additional electric drive, a current mass 92 of the towing vehicle 12 is determined in the brake control unit 32 in addition to the current drive force and an acceleration demand 46 is generated depending on the current drive force and the current mass 92 and transmitted on a CAN-ISO 11992-2 bus 30. The bus 30 is connected to a trailer brake control unit 48 of the trailer vehicle 16, to which the acceleration demand 46 is conveyed.

An electric drive 52 is furthermore connected via a further bus 50 to the trailer brake control unit 48 which receives the acceleration demand 46 via the bus 30. The electric drive 52 includes an energy store 54, which is rechargeable and can also be referred to as an accumulator. In addition to the energy store 54, the electric drive 52 includes two converters 56, which supply electric motors 58 with the energy from the energy store 54 in order to generate a positive torque. The energy store 54, the converters 56 and the electric motors 58 correspond to components 59 of the electric drive 52. According to an alternative embodiment, only one electric motor 58 is provided, which also has only one converter 56 and drives two or more wheels 20a via a differential.

The electric motors 58 in FIG. 1 can also be operated in generator mode or regeneratively so that electric energy 55 is fed back into the energy store 54 via the converters 56. The converter 56 of the electric drive 52 is connected to the trailer brake control unit 48 via the further bus 50 in order to receive an actuating signal 60 from the trailer brake control unit 48 which is generated in the trailer brake control unit 48 depending on the acceleration demand 46.

An actuation of the converter 56, which takes place depending on the actuating signal 60, on the one hand specifies whether the electric motors 58 should be operated in generator mode or in motor mode and the torque which should be applied here. The torque is preferably determined from a desired drive force, which is conveyed in the acceleration demand. When the electric motors 58 are operated in motor mode, this refers to a positive torque, whereas, in the regenerative mode of the electric motor 58, the torque, that is, a value of the torque, is referred to or defined as a negative torque.

To actuate the electric drive 52, namely in particular the converters 56, the actuating signal 60 is accordingly sent by the trailer brake control unit 48 to the electric drive 52 via the further bus 50 and, in the present case, two torque values, preferably corresponding to the drive force and with which wheel-specific drive torques are generated, are extracted from the actuating signal 60. The electric drive 52 preferably also sends a status signal 64 to the trailer brake control unit 48 so that the trailer brake control unit 48 can, amongst other things, be informed, for example, as to which currently available torque or which currently available change in torque can be provided by the electric drive 52 at the current time. The currently available torques or changes in torque are, for example, dependent on the current operating status of the electric drive 52. The status signal 64 moreover or alternatively includes the current torque which is generated by the electric motor(s) 58 at the time.

The trailer brake control unit 48 is moreover connected to speed sensors 21, as is the brake control unit 32 of the towing vehicle 12, in order to monitor or determine a slip of at least one driven wheel 20a of the trailer vehicle 16. The trailer brake control unit 48 furthermore sends a status signal 62 to the brake control unit 32 of the towing vehicle 12 in which, on the one hand, the information, or at least some of the information, contained in the status signal 64 is contained. The status signal 62 moreover preferably also includes the slip of the at least one driven wheel 20a of the trailer vehicle 16. This can likewise be taken into account in the brake control unit 32 of the towing vehicle 12 to generate the acceleration demand 46. A mass of the trailer vehicle 16 which is determined in the trailer brake control unit 48 is moreover or alternatively conveyed in the status signal 62 to the brake control unit 32 of the towing vehicle. This mass 98 of the trailer vehicle 16 is likewise preferably taken into account when determining the acceleration demand 46.

Figure 2:
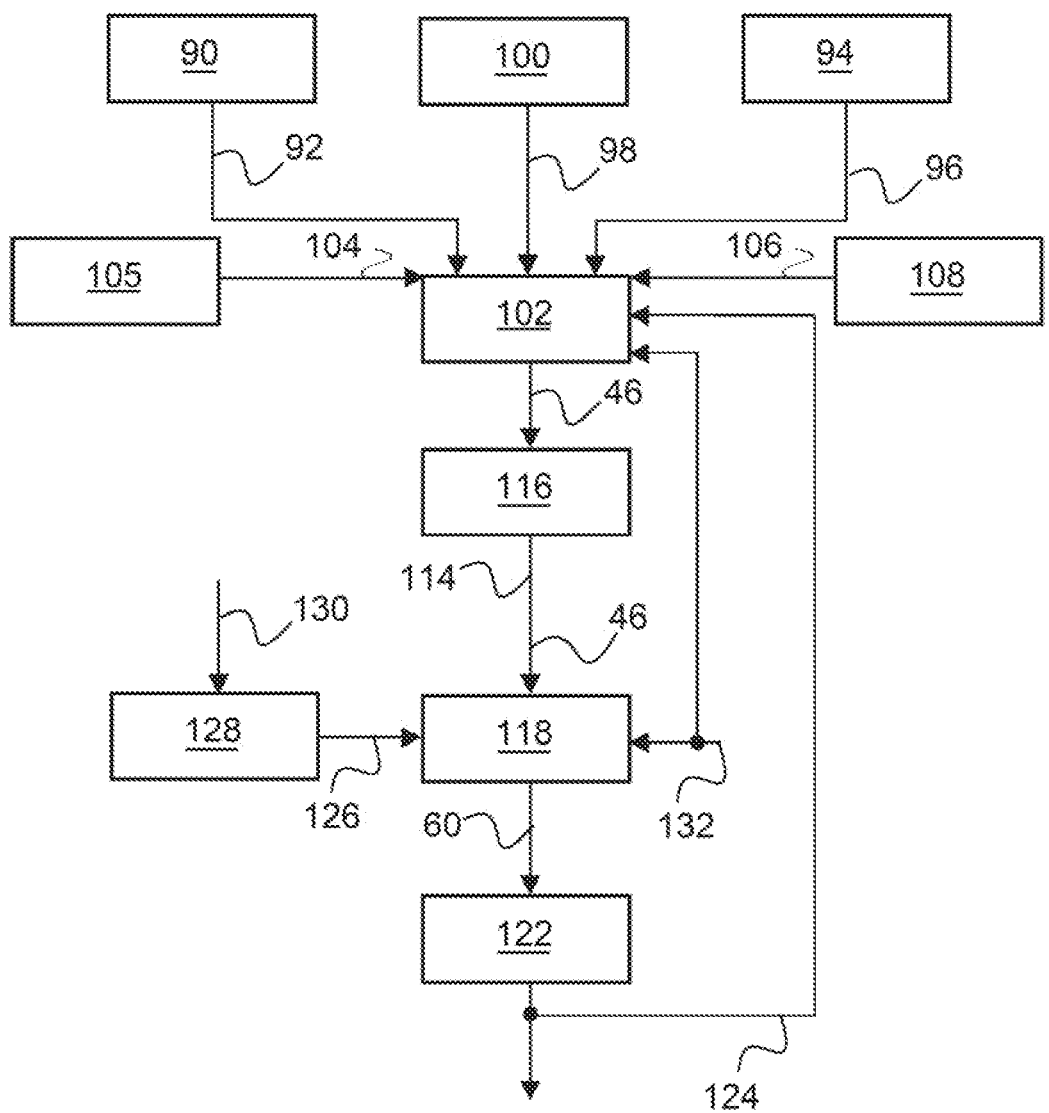
FIG. 2 shows the steps of an embodiment of the method.

FIG. 2 shows the steps of an embodiment of the method. Firstly, in step 90, a current mass 92 of a towing vehicle 12 is determined. At preferably the same time, in step 94, a current drive force 96 of a drive of the towing vehicle 12 is determined. A mass 98 of the trailer vehicle 16 is moreover determined in step 100. The current mass 92 of the towing vehicle 12, the current mass 98 of the trailer vehicle 16 and the current drive force 96 of the towing vehicle 12 are supplied to step 102, in which an acceleration demand 46 is determined depending on these values. In addition to the masses 92, 98 and the current drive force 96, a measured or detected slip 104 of the towing vehicle 12, which was determined in step 105, and a measured or detected slip 106 of the trailer vehicle 16, which was determined in step 108, are likewise supplied to step 102 to determine the acceleration demand 46.

The acceleration demand 46 is then conveyed to a trailer brake control unit 48 in step 116 and an actuating signal 60 for actuating an electric drive 52 depending on the acceleration demand 46 is generated by the trailer brake control unit 48 in step 118. In this case, the acceleration signal is interpreted as a maximum value 114. Depending on the actuating signal 60, a desired drive force 124 is then generated by an electric drive 52 in step 122. To determine the actuating signal 60 in step 118, a motor speed-torque map 126 is supplied to step 118, which map is predefined for the electric drive 52 and stored in the trailer brake control unit 48. Depending on a charge status 130 of an energy store 54 of the electric drive 52, the motor speed-torque map 126 is adapted to the charge status 130 in a step 128.

The actuating signal 60 is furthermore determined in step 118 depending on a speed 132 of at least one motor 58 of the electric drive 52. According to this embodiment, this speed 132 and also the currently generated drive force 124 are taken into account when determining the acceleration demand 46. By way of example, for this purpose, the currently generated drive force 124 and the speed 132 are conveyed by the trailer brake control unit 48 to the brake control unit 32 of the towing vehicle 12 in a status signal 62, after having been previously conveyed by the electric drive 52 to the trailer brake control unit 48 as status signal 64.

Figure 3:
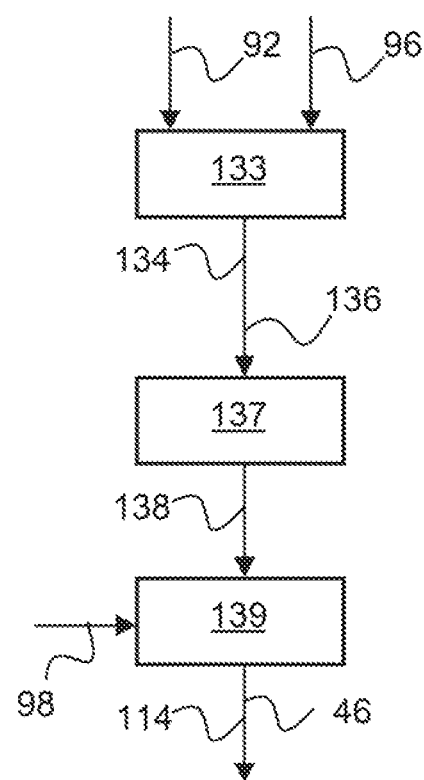
FIG. 3 shows steps for determining an acceleration demand.

FIG. 3 shows the steps for determining an acceleration demand 46. To determine this, the current mass 92 of the towing vehicle 12 and the current drive force 96 of the towing vehicle 12 are firstly supplied to a step 133 with which a current acceleration 134 of the towing vehicle 12 is determined. In this case, the current acceleration 134 of the towing vehicle 12 includes a value 136. The value 136 of the current acceleration 134 of the towing vehicle 12 is then supplied to a step 137, in which a desired acceleration 138 of the trailer vehicle 16 is derived from the current acceleration 134 of the towing vehicle 12. In a subsequent step of the method 139, depending on the mass 98 of the trailer vehicle 16, a maximum value 114 is output as an acceleration demand 46. This value corresponds to a value of a desired drive force 124.

Figure 4:
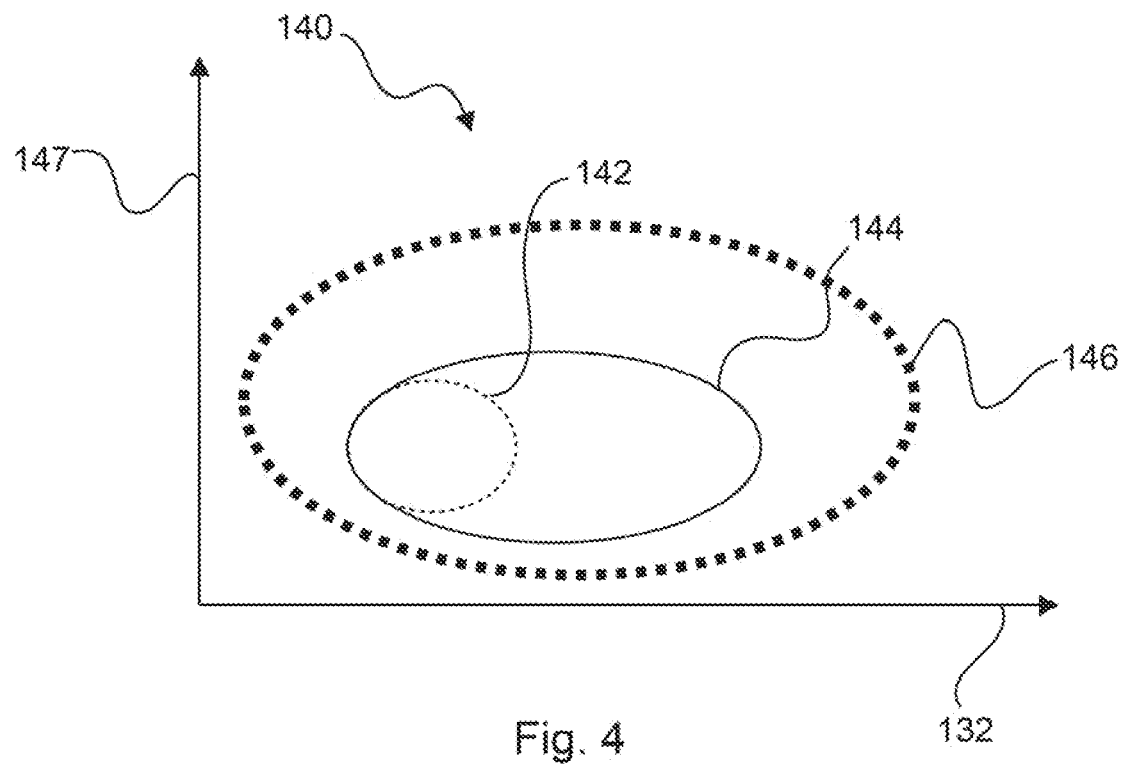
FIG. 4 shows a motor speed-torque map; and,
FIG. 5 shows a dependence of the map adjustment on a charge status of an energy store.

FIG. 4 shows an example of a motor speed-torque map 140, which preferably has a plurality of operating ranges 142 to 146. The fields each include a value range of combinations of the speed 132 of the electric drive 52, which is plotted on the horizontal axis, and torques 124, which are shown on the vertical axis.

A current operating range 142 corresponds to the range within which the electric drive 52 is preferably operated at the time as a result of the actuating signal 60, whilst this current operating range 142 can be adjusted within an optimum operating range 144 depending on the current speed 132. The optimum operating range 144 can in turn vary within a reliable operating range 146 depending on the charge status 130. The map 140 therefore describes ranges of values within which combinations of the motor speed 132 and torque of the electric motor 58, that is, the drive force 124, are adjustable and are separate from the remaining range in which the electric motor 58 should or must not be operated.

Figure 5:
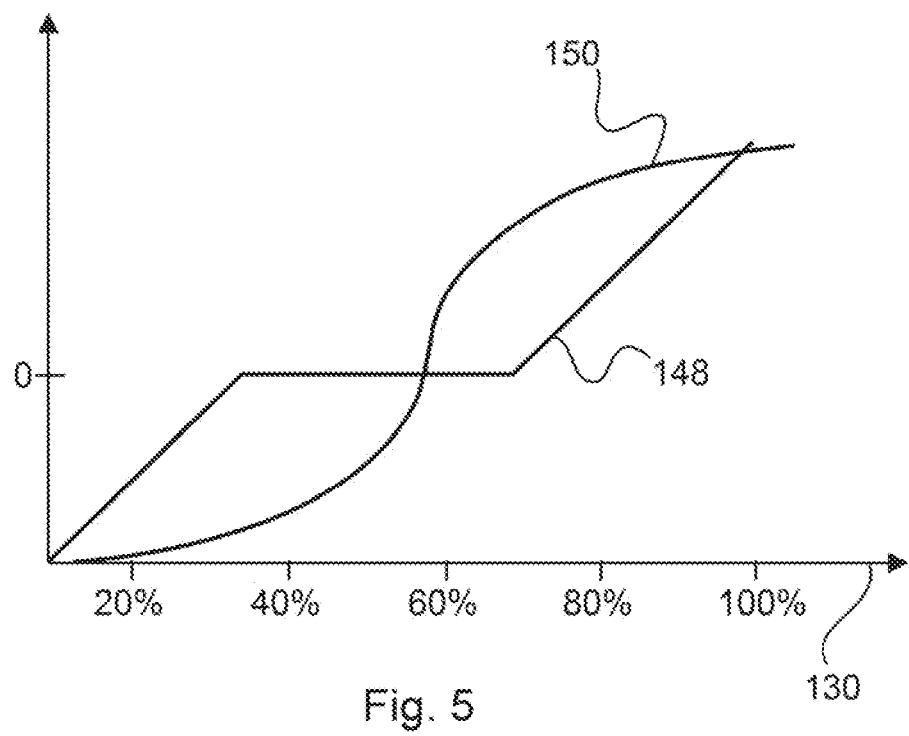

FIG. 5 shows a dependence of the map 140 on the charge status 130 of the energy store 54, wherein the charge status 130 is plotted between 0 and 100% on the horizontal axis and an increase or lowering of the optimum operating range 144 with respect to a zero value of the optimum operating range 144 is shown on the vertical axis. An increase or lowering of the optimum operating range can take place either at intervals, as illustrated by the curve 148, or dynamically, as illustrated by the curve 150.

In the present embodiment, between approximately 30 and 80% of the charge status 130 of the optimum operating range 144 is located substantially centrally in the reliable operating range 146 if an adaptation at intervals is assumed. Outside these limits, the optimum operating range 144 is adjusted either upwards or downwards. It is therefore possible to operate the electric drive 52 with a suitable efficiency.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

10 Vehicle combination
12 Towing vehicle
14 Drawbar
16 Trailer vehicle
18 Axles
20a Driven wheels
20b Non-driven wheels
21 Wheel speed sensors
22 Friction brake
23 Gas pedal position
24 Gas pedal
25 Brake pedal position
26 Brake pedal
27 Request for an increase in speed
28 Vehicle control unit
29 Brake request
30 CAN bus
31 Requested positive acceleration
32 Brake control unit
34 Connection
46 Acceleration demand
48 Trailer brake control unit
50 Further bus
52 Electric drive
54 Energy store
55 Energy
56 Converter
58 Electric motors
59 Components of the electric drive
60 Actuating signal
62 Status signal
64 Status signal
90 Step of the method
92 Current mass of the towing vehicle
94 Step of the method
96 Current drive force
98 Current mass of the trailer vehicle
100 Step of the method
102 Step of the method
104 Slip of the towing vehicle
105 Step of the method
106 Current slip of the trailer vehicle
108 Step of the method
110 Drive torque
112 Step of the method
114 Value, Maximum value
116-118 Steps of the method
122 Step of the method
124 Drive force
126 Motor speed-torque map
128 Step of the method
130 Charge status
132 Speed
133 Step of the method
134 Current acceleration of the towing vehicle
136 Value
137 Step of the method
138 Desired acceleration of the trailer vehicle
139 Step of the method
140 Motor speed-torque map
142 Current operating range
144 Optimum operating range
146 Permissible operating range
148 Curve
150 Curve

What is claimed is:

1. A method for actuating an electric drive of a trailer vehicle with a towing vehicle equipped with air springs, the method comprising:
   determining a current mass of the towing vehicle in dependence upon air pressure in the air springs of the towing vehicle;
   determining a current drive force of the towing vehicle;
   determining an acceleration demand in dependence upon the current mass of the towing vehicle and the current drive force; and,
   actuating the electric drive via an actuating signal in dependence upon the acceleration demand.

2. The method of claim 1, wherein the acceleration demand is additionally determined in dependence upon a current trailer mass of the trailer vehicle.

3. The method of claim 1 further comprising:
   determining a current trailer mass of the trailer vehicle; and,
   wherein the acceleration demand is additionally determined in dependence upon the current trailer mass of the trailer vehicle.

4. The method of claim 1, wherein the acceleration demand at least one of:
   corresponds to or includes a maximum value for a desired drive force or a drive force to be generated by the electric drive; and,
   is conveyed by a brake control unit of the towing vehicle to a trailer brake control unit of the trailer vehicle via a CAN-ISO 11992-2 bus.

5. The method of claim 1, wherein the electric drive is configured to generate a drive force in dependence upon an actuating signal and the actuating signal is generated in dependence upon at least one of:
   the acceleration demand and a charge status of an energy store of the electric drive; and, the actuating signal is generated in dependence upon at least a current speed of at least one electric motor of the electric drive.

6. The method of claim 1, wherein a motor speed-torque map is specified; and, the actuating signal is generated such that the electric drive generates a drive torque which lies within the motor speed-torque map at a current speed of the electric motor.

7. The method of claim 6, wherein the motor speed-torque map is adjustable in dependence upon a charge status of an energy store of the electric drive.

8. The method of claim 6, wherein the drive torque generated by the electric drive lies within an optimum range of the motor speed-torque map at the current speed of the electric motor.

9. The method of claim 1, wherein the electric drive sends a status signal to the towing vehicle, wherein the signal includes the current drive force generated by the electric drive and a current trailer mass of the trailer vehicle.

10. The method of claim 9, wherein the status signal includes a current slip of at least one driven wheel of the trailer vehicle; and, the acceleration demand is determined additionally in dependence upon the current slip of the trailer vehicle.

11. The method of claim 1, wherein the method is executed by at least one of a brake control unit of the towing vehicle and a trailer brake control unit of the trailer vehicle.

12. A method for actuating an electric drive of a trailer vehicle with a towing vehicle equipped with air springs, the method comprising:
determining a current mass of the towing vehicle in dependence upon air pressure in the air springs of the towing vehicle;
determining a current drive force of the towing vehicle;
determining an acceleration demand in dependence upon the current mass of the towing vehicle and the current drive force;
actuating the electric drive via an actuating signal in dependence upon the acceleration demand;
wherein the acceleration demand comprises a value for a desired drive force of the electric drive, the method further comprising:
determining the value of the desired drive force in that a current acceleration of the towing vehicle is first determined in dependence upon the current drive force of the towing vehicle and the current mass of the towing vehicle;
determining a desired acceleration of the trailer vehicle in dependence upon the current acceleration of the towing vehicle; and,
wherein the value of the desired drive force of the electric drive is determined in dependence upon the desired acceleration and a current trailer mass of the trailer vehicle.

13. The method of claim 12, wherein the desired acceleration of the trailer vehicle is less than or equal to the current acceleration of the towing vehicle.

14. The method of claim 12, wherein the current acceleration of the towing vehicle is determined in dependence upon a result of a division of the current drive force of the towing vehicle by the current mass of the towing vehicle or corresponds to this result.

15. The method of claim 12, wherein the value of the desired drive force of the trailer vehicle is determined in dependence upon a result of a product of the current mass of the trailer vehicle and the desired acceleration of the trailer vehicle.

16. The method of claim 12, wherein the current acceleration of the towing vehicle is additionally determined in dependence upon a current slip of at least one driven wheel of the towing vehicle.

17. A control unit comprising:
a non-transitory computer readable storage medium having program code stored thereon;
a processor;
said program code being configured, when executed by the processor, to:
determine a current mass of a towing vehicle equipped with air springs in dependence upon air pressure in the air springs;
determine a current drive force of the towing vehicle;
determine an acceleration demand in dependence upon the current mass of the towing vehicle and the current drive force; and,
actuate the electric drive via an actuating signal in dependence upon the acceleration demand.

18. The control unit as claimed in claim 17, wherein said control unit is a brake control unit.

19. The control unit as claimed in claim 17, wherein said control unit is a trailer brake control unit.

20. A vehicle combination comprising:
a towing vehicle equipped with air springs and including a towing brake control unit;
a trailer vehicle including a trailer brake control unit;
said brake control unit and said trailer brake control unit having a processor, a non-transitory computer readable storage medium and program code stored on said non-transitory computer readable storage medium;
said program code being, when executed by the processor, configured to:
determine a current mass of a towing vehicle in dependence upon air pressure in said air springs of said towing vehicle;
determine a current drive force of said towing vehicle;
determine an acceleration demand in dependence upon the current mass and the current drive force; and,
actuate the electric drive via an actuating signal in dependence upon the acceleration demand.

21. A method for actuating an electric drive of a trailer vehicle with a towing vehicle, the method comprising:
determining a current mass of the towing vehicle;
determining a current mass of the trailer vehicle;
determining a current drive force of the towing vehicle;
determining an acceleration demand in dependence upon the current mass of the towing vehicle, the current mass of the trailer vehicle and the current drive force; and,
actuating the electric drive via an actuating signal in dependence upon the acceleration demand.

* * * * *